Sept. 8, 1959 V. H. COOK 2,902,787
TRANSPARENCY SUPPORTING AND ILLUMINATING DEVICE
Filed Dec. 23, 1957

INVENTOR
Vernon H. Cook,
BY
ATTORNEY

2,902,787
Patented Sept. 8, 1959

2,902,787
TRANSPARENCY SUPPORTING AND ILLUMINATING DEVICE

Vernon H. Cook, East Hartford, Conn.

Application December 23, 1957, Serial No. 704,404

1 Claim. (Cl. 40—152.2)

My invention relates to illumination of transparencies, and more particularly to a reflector for use with frames in which transparent photographs or pictures are mounted.

An object of my invention is to provide an improved reflector adapted to be easily and quickly applied to or removed from a frame or other holder for transparencies.

Another object of my invention is to provide an improved reflector adapted for snap-locking engagement with a frame or other holder for transparencies.

Yet another object of my invention is to provide a combined reflector and support for use with a frame for transparencies, constructed and arranged to support the frame and associated transparency when the frame is in the normal viewing position, in such manner that undesirable reflections are eliminated.

Still another object of my invention is to provide an improved arrangement for supporting and illuminating transparencies, wherein the reflector member, forming the lamp housing, is provided with peripheral flange portions adapted for engagement with the transparency frame along the inner sides of the frame at the rear thereof.

A further object of my invention is to provide an improved arrangement for supporting and illuminating transparencies, wherein the frame or holder for the transparency is formed from an elastic material, the frame being constructed and arranged for interlocking engagement with the peripheral portion of the reflector member.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

Figure 1:
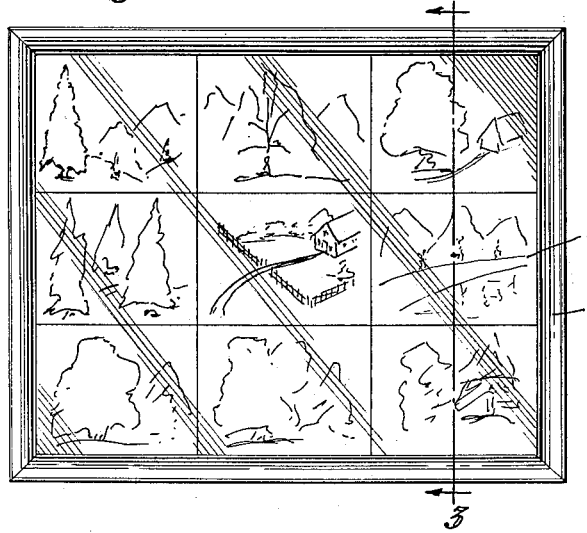
Figure 1 is a front elevational view of the transparency supporting and illuminating device of the present invention.

Referring to the drawings, and more particularly to Figs. 1–4, the transparency illuminating and supporting arrangement comprises a conventional photograph frame 1, having a sheet of clear glass 2, a transparency 3, and a sheet of suitable light-diffusing material 4, mounted therein. Attached to the rear of the frame is a reflector member 5 constituting a lamp housing and a support for the frame and associated transparency. The reflector, which is formed from a single piece of resilient material, preferably a light gauge metal, comprises a rectangular shaped rear panel 6, trapezoidal shaped side panels 7, and trapezoidal shaped top and bottom panels 8 and 9, respectively. The lower base 10 of each of the side panels is formed with a laterally extending flange 11, adapted to fit under the exposed portions 12, of brads 13, used to retain the sheets 2 and 4, and the transparency 3, within the frame.

Figure 2:
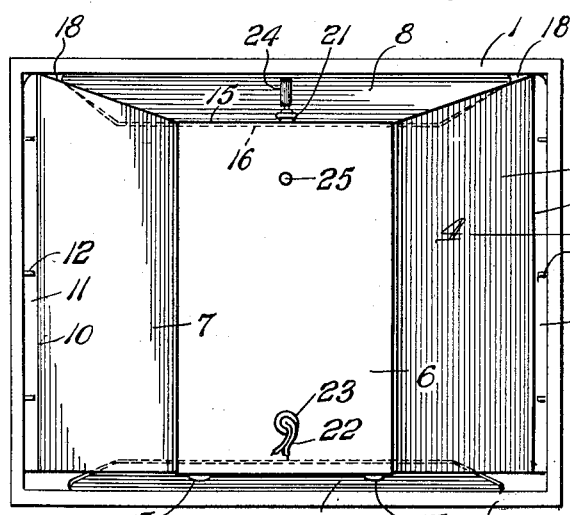
Fig. 2 is a rear view of the device shown in Fig. 1.
Figure 4:
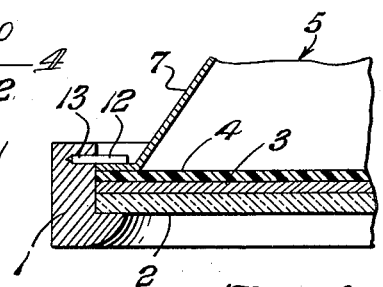
Fig. 4 is an enlarged sectional view along line 4—4 of Fig. 2.

The top panel 8 is bent inwardly at right angles to the plane of the rear panel 6, along its line of juncture 14 with the rear panel, and upwardly at an acute angle along the line 15, forming a horizontal portion 16 between the bend or fold lines, the free edge of the panel abutting the inner face of the frame. The bottom panel 9 is formed in substantially the same manner as the top panel, with its free edge in engagement with the inner face of the frame. In order to protect the surface on which the reflector rests against abrasion, when the device is in use, the bottom panel is provided with rubber grommets 17 arranged in spaced relation with respect to the portion of the bottom panel contiguous to the rear panel, as shown in Fig. 2. In connection with the construction and arrangement of the reflector panels, it will be noted (Fig. 2) that the configuration of the top and bottom panels is such that a gap or opening 18 is formed between each of the opposite edges of these panels and the contiguous surfaces of the side panels. The purpose of this arrangement is to provide for ventilation of the interior of the lamp housing formed by the reflector.

Positioned within the reflector 5 is an electric lamp socket 19 having a lamp bulb 20 therein, the socket being supported on the top panel 8, centrally of the horizontal portion 16, by means of a fitting 21. Current for the lamp is supplied by leads 22 which are threaded through an insulating grommet 23, mounted in the rear panel. A switch device 24 is provided for controlling the flow of current to the lamp.

In assembling the device, the transparency, which may consist of a single photograph or picture, or a plurality of individual photographs or pictures, is mounted in the frame between the clear glass and the sheet of light-diffusing material, these elements being retained in the frame by the brads 13, which are driven into the frame at spaced points along the inner surfaces of the sides of the frame, slightly above the surface of the light-diffusing material. The reflector 5 is attached to the frame by flexing the side panels 7 inwardly until the ends of flanges 11 clear the exposed portions 12 of the brads, and by pressing downwardly, and simultaneously releasing the pressure on the panels they spring outwardly, thus forcing the end portions of the flanges into seated position between the brads and the light-diffusing sheet. When it is desired to substitute a frame, with its associated transparency, or to obtain access to the interior of the housing for the purpose of replacing the lamp, the housing is easily removed by simply unseating the flanges from beneath the brads, and moving the frame in an outward direction away from the housing. It will thus be seen that by means of my improved transparency illuminating and supporting arrangement, that the frame may be quickly and easily attached to or removed from the reflector without the use of special tools, and that in my improved construction, conventional clamps or special fittings for securing the parts together have been eliminated.

Figure 3:
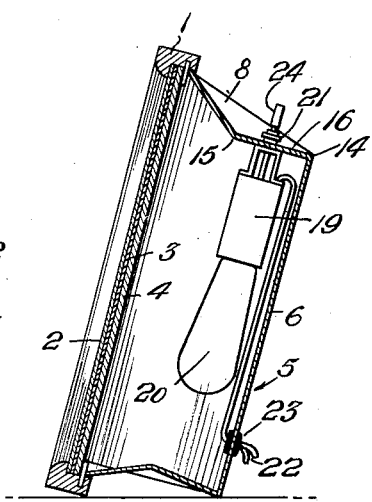
Fig. 3 is a sectional view along line 3—3 of Fig. 1, showing the position of the device when in use.

When in use, the device may be supported on a flat surface or hung on a wall by means of a suitable hook or picture hanger adapted to seat in the opening 25 formed in the rear panel. When the device is placed on a flat surface, it assumes the rearwardly tilted position, as shown in Fig. 3, thus eliminating undesirable direct reflection of light rays from the glass.

While the reflector has been described as having flanges on the side panels, it will be understood that the present invention comprehends the provision of flanges on all of the panels, and in lieu of seating the flanges under the brads, the inner surface of the frame will be formed with a groove to receive and seat the flanges.

Figures 5, 6:
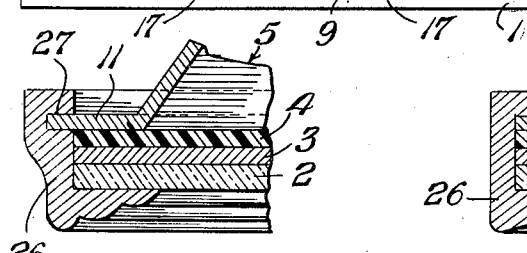
Fig. 5 is an enlarged sectional view, similar to Fig. 4, showing a modification of the transparency mounting frame.
Fig. 6 is a view similar to Fig. 5, showing another modification of the transparency mounting frame.

Referring to Fig. 5, there is shown a modified form of holder for the transparency, which may be used instead of a conventional picture frame, as described hereinabove. In the modification, a simulated frame in the form of a closed band 26 of plastic or pre-formed rubber is fitted over and around the edges of the glass 2, transparency 3 and the light-diffusing material 4, which are retained within the band by the flanges 11 of the panels, the free edge portions of the flanges being seated in the peripheral groove 27 of the band. In the modification shown in Fig. 6 the band 26' is formed with an inner peripheral groove of sufficient width to receive the flanges 11 in clamping engagement with the components of the transparency mounting.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claim.

I claim:

A transparency supporting and illuminating device of the character described, comprising a reflector member, constituting a lamp housing, formed from a single piece of sheet metal, having a rectangular shaped rear panel, and trapezoidal shaped top, bottom and side panels extending inwardly from the ends and sides, respectively, of the rear panel, each of said side panels having a laterally extending flange on the free edge thereof, the top and bottom panels being bent inwardly at right angles to the plane of the rear panel along their lines of juncture with the rear panel and outwardly along lines intermediate of said panels, whereby to form a horizontal portion in each of the panels between the intermediate fold line and the edge of the rear panel, each of the opposite edges of the top and bottom panels defining a gap with its contiguous surface of its adjacent framing side panel, a lamp socket within the housing, said socket being supported on the horizontal portion of the top panel, a rectangular shaped frame having a transparency mounted therein, and means associated with the frame to receive the end portions of the laterally extending flanges of the side panels, whereby the frame is detachably secured to the housing.

References Cited in the file of this patent
UNITED STATES PATENTS

| | | |
|---|---|---|
| 1,904,318 | Lehere | Apr. 18, 1933 |
| 2,037,041 | Pendleton | Apr. 14, 1936 |
| 2,623,314 | Lombard | Dec. 30, 1952 |
| 2,756,529 | Mazzocco | July 31, 1956 |